May 9, 1950            L. FRANK            2,506,919
BUTTER CUTTER
Filed Nov. 27, 1945            2 Sheets-Sheet 1
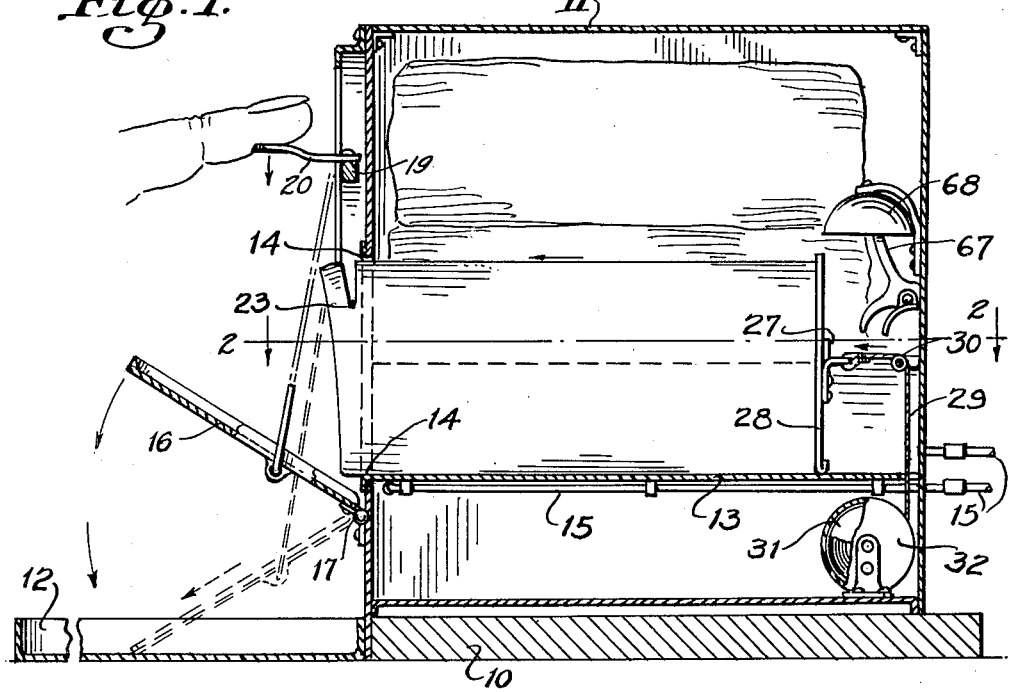
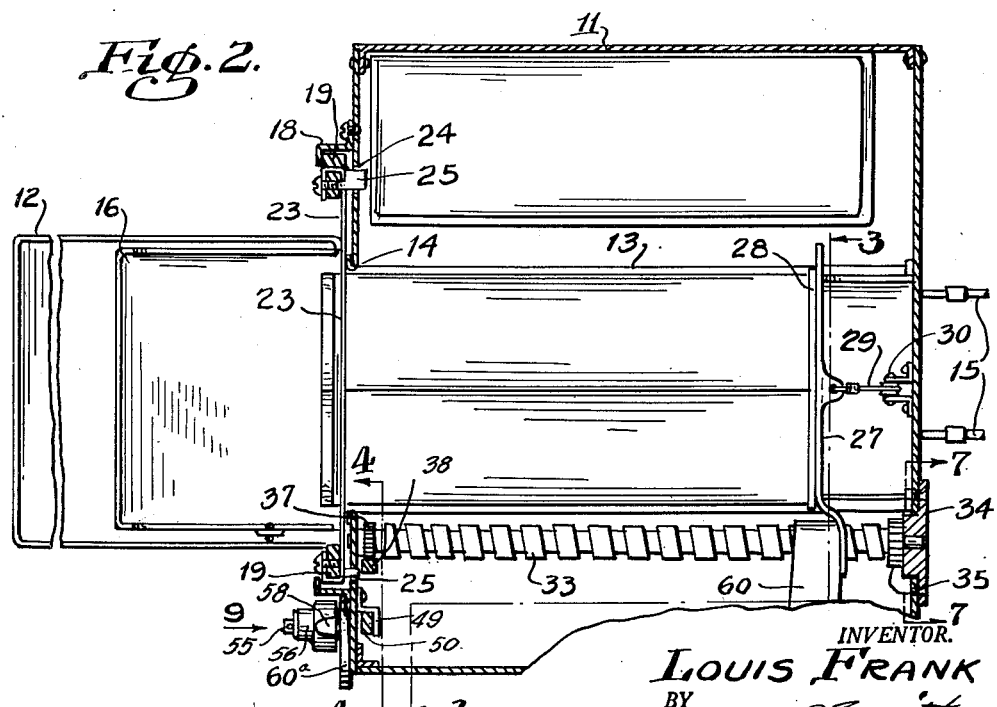
INVENTOR.
LOUIS FRANK
BY
ATTORNEY.

May 9, 1950  L. FRANK  2,506,919
BUTTER CUTTER
Filed Nov. 27, 1945  2 Sheets-Sheet 2
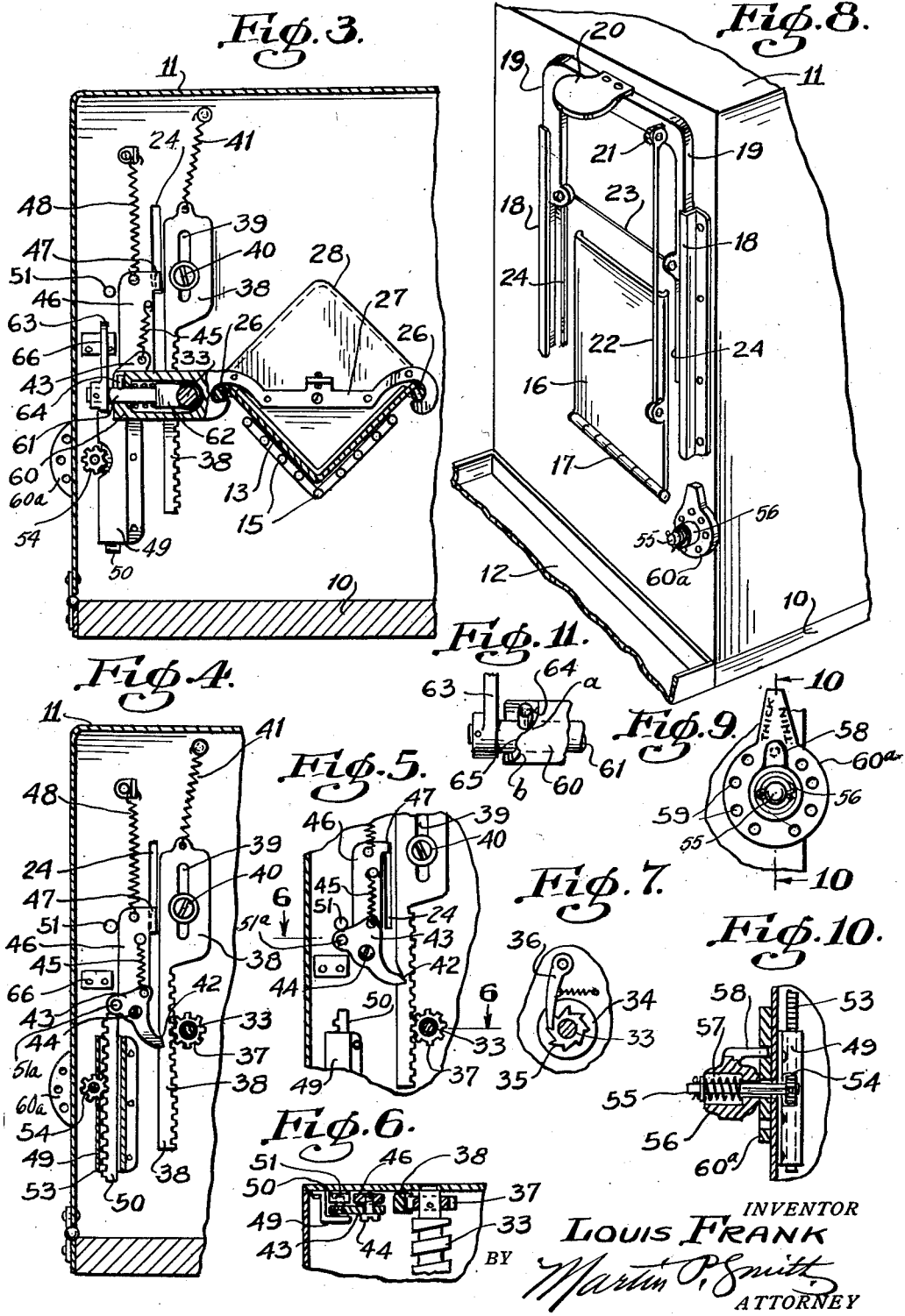
INVENTOR
LOUIS FRANK
BY Martin P. Smith
ATTORNEY Patented May 9, 1950

2,506,919

UNITED STATES PATENT OFFICE 2,506,919

BUTTER CUTTER

Louis Frank, Fellows, Calif.

Application November 27, 1945, Serial No. 631,143

2 Claims. (Cl. 31—20)

My invention relates to a machine particularly designed for cutting blocks of butter into slices or portions for individual service and has for its principal objects, to provide a machine having a refrigerated housing through and from which the block of butter is fed intermittently, with manually operable means on the front wall of the housing, for cutting the butter into slices of uniform size, as the block emerges from said housing, and further, to provide a simple means for regulating the thickness of the slices or pats of butter cut from the block or body.

A further object of my invention is, to provide a machine of the character referred to that is especially applicable for use in restaurants, cafes and the like, inasmuch as the use of the machine is effective in saving much of the time and labor ordinarily involved in the cutting of large blocks or pieces of butter into slices or pats of uniform size and further, enabling each patron to be served with one or more neatly cut, cool, firm pats of butter.

With the foregoing and other objects in view, my invention consists in certain novel features of construction and arrangement of parts which will be hereinafter more fully described and claimed and illustrated in the accompanying drawing in which:

Fig. 1 is a vertical section taken lengthwise through the center of my improved butter cutting machine.

Fig. 2 is a horizontal section taken approximately on the line 2—2 of Fig. 1.

Fig. 3 is a cross section taken approximately on the line 3—3 of Fig. 2.

Fig. 4 is a cross section taken approximately on the line 4—4 of Fig. 2.

Fig. 5 is a fragmentary cross section similar to Fig. 4 and showing the shaft operating rack and the rack actuating pawl in elevated positions.

Fig. 6 is a horizontal section taken on the line 6—6 of Fig. 5.

Fig. 7 is a detail section taken on the line 7—7 of Fig. 2.

Fig. 8 is a perspective view of the front end of the machine.

Fig. 9 is an elevational view taken looking in the direction indicated by the arrow 9 in Fig. 2.

Fig. 10 is a vertical section taken on the line 10—10 of Fig. 9.

Fig. 11 is a detail plan view of a part of the means used for engaging a nut with the threaded rod of the butter feeding means.

Referring by numerals to the accompanying drawings which illustrate a preferred embodiment of my invention, 10 designates a base supporting a substantially rectangular housing 11, of sheet metal or plastics and with a shallow pan 12 in front of base 10.

Secured in the lower portion of the chamber within housing 11, is a longitudinally disposed V-shaped trough 13, the forward end of which is secured to the lower edges of a square opening 14, in the front wall of said housing. This trough may be lined with glass, porcelain or the like, or its surface may be wax coated or treated so as to provide a smooth finish, in order that butter and the like will not stick to said surface.

Arranged beneath the trough 13 is a coil 15, through which a refrigerant may be circulated to maintain the butter in said trough at low temperature. The lower edge of a door 16 which manually closes opening 14, is connected by a hinge 17 to the front wall of housing 11 and secured on said front wall to the sides of said door are vertical ways 18, in which are arranged for sliding movement the legs of an inverted U-shaped frame 19.

Projecting outwardly from the upper end of frame 19 is a thumb or finger plate 20 and pivotally connected at 21 to the top of said frame is the upper end of a depending rod 22, the lower end of which is pivotally connected to the side of door 16 below the center thereof. Thus when frame 19 is moved downward rod 22 will swing the door outward (see Fig. 1).

Connected on the vertical legs of frame 19 and normally positioned a short distance above door 16, is a horizontally disposed wire 23, which serves to cut pats or slices of butter from the forward end of the rectangular body of butter positioned in trough 13.

Formed in the front wall of housing 11 adjacent and parallel with ways 18 are vertical slots 24 and projecting from the legs of frame 19 through said slots are pins 25. Secured to the upper side edges of trough 13 are rods 26, the ends of which are secured to the front and rear walls of housing 11. Arranged to slide freely on rods 26 are the ends of a cross bar 27, to which is secured a rectangular plate 28, the lower half of which occupies said trough and in action this plate pushes the block of butter forwardly through the said trough.

Secured to the center of cross bar 27 is one end of a small cable which passes over a pulley 30 on the back of the housing, thence downwardly to a conventional spring actuated reel 31, contained within a housing 32.

As plate 28 is moved forward in trough 13, cable 29 unwinds from reel 21 and as the latter rotates, its spiral spring is wound up and when said plate is released at the end of its forward travel said spring will act to wind cable 29 on its drum and draw plate 28 to the rear end of the trough.

The forward end of a threaded rod 33 is journaled in the front wall of housing 11, at the side of trough 13 and the rear end of this is journaled in a disc 34, the latter being detachably mounted on the rear wall of the housing to permit ready insertion or removal of said rod 33.

Mounted on the rear portion of rod 33 is a ratchet wheel 35, engaged by a detent 36, thus holding rod 33 against reverse rotation (see Fig. 7).

Secured on the forward portion of rod 33 just inside the front wall of housing 10, is a pinion 37 having pointed teeth which engage the teeth of a vertically disposed rack 38, having a vertical slot 39 through which passes a pin or screw 40 seated in said front wall.

The lower end of a retractile spring 41 is secured to the upper end of rack 38, with the upper end of said spring connected to the upper portion of the front wall of the housing and said spring being slightly inclined so as to normally swing the lower portion of rack 38 away from the pinion 37.

Formed on the edge of rack 38 opposite the toothed edge, is a notch 42 adapted to receive the lower end of a pawl 43, pivoted at 44, with a retractile spring 45, connected to the upper end of said pawl for normally swinging the point thereof into notch 42.

Pawl 43 is pivoted to a plate 46 arranged to slide vertically on the inner face of the front wall of housing 11 and an ear 47 on the upper end of said plate projects through the corresponding slot 24 and is connected to the corresponding leg of frame 19.

The lower end of a retractile spring 48 is connected to the upper end of plate 46 and normally holds same at the upper end of its movement.

Arranged to slide in a vertical guide 49 to the side of the lower portion of rack 38, is a bar 50, the upper end of which is adapted to be engaged by a pin 51a, projecting from the upper end of pawl 43 and thereby actuate same, to disengage its point from notch 42. Thus rack 50 acts as a vertically adjustable stop to control the downward travel of plate 46 and pawl 43 carried thereby.

This action occurs at the lower end of the travel of rack bar 38, and at the upper end of the travel of said rack bar, pin 51a strikes against a stop pin 51 fixed to the front wall of the housing, to actuate said pawl and engage its point in notch 42, when rack 38 is at its upper limit of movement.

To adjust the vertical position of bar 50 in order to control the feeding movement of plate 28 and thereby regulate the thickness of the portions of butter cut from the body in the trough, one edge of said bar is provided with rack teeth 53 that are engaged by the teeth of a pinion 54 carried by a square pin 55 which extends outward through the front wall of the housing and having arranged to slide thereupon a knob 56, the outward movement of which is yieldingly resisted by an expansive coil spring 57, mounted upon said pin within said knob. (See Fig. 10.)

Knob 56 carries a pin 58, that is adapted to be set in any one of a series of apertures 59, formed in an arcuate row, in a plate 60a on the wall of the housing around pin 55 (see Fig. 9) thus setting bar 50 to regulate the thickness of the pats cut from the block of butter in trough 13.

A tubular extension 60 projects from bar 27 and has a horizontal aperture for threaded rod 33 and arranged for sliding movement in the outer portion of said extension, is a spring pressed pin 61, having on its inner end, a tooth or nut 62, which engages the thread for 33, to drive bar 27, plate 28 and tube 60 forwardly in trough 13.

Mounted on the outer end of pin 61 is an upstanding lever 63 and carried by the outer portion of pin 61, is a short radial pin 64, which occupies a notch 65 in the outer end of tube 60.

At the forward end of the travel of plate 28, tube 60 and associated parts, lever 63, tilted forwardly, strikes against a bracket 66 on the front wall of housing 10 to engage nut 62 from screw 33 and at the rear end of the travel of said plate 28 and associated parts, said lever, tilted rearwardly, strikes against the lower end of a lever 67 pivoted on the rear wall of the housing and the upper end of said lever serves as a hammer, to strike a small bell 68, thus giving an audible warning that the trough is empty.

Notch 65 in the outer end of tube 60, has a deep portion $a$ for pin 61 when nut 62 is engaged with the threaded rod 33 and a shadow portion $b$ which receives said pin, when the nut is withdrawn from engagement with said threaded rod. (See Fig. 11.)

A block or body of butter is placed in trough 13 with plate 28 behind said block, with nut 62 in engagement with threaded rod 33, pin 64 in the deep portion of notch 65 and lever tilted forward.

To actuate the machine and cut a slice from the forward end of the block of butter, plate 20 is pressed down, thereby moving frame 19 downward and through rod 22, the door 16 will be swung outward and downward as shown by solid and dotted lines Fig. 1.

Plate 46 slidably connected to frame 19 by ear 47 which passes through slot 24 will be moved downward a short distance, with the point of pawl 43 riding on the edge of rack bar 38 until said point enters notch 42 in said bar and the latter will now be moved downward so that its teeth, engaging the teeth of pinion 37, will rotate shaft 33 and through the engagement of nut 62 with said shaft, tube 60, frame 27 and plate 28 will be moved a short distance forward, thus feeding the block forwardly through the trough 13 and through opening 14, in the front wall of the housing.

Due to the elevated position of the cutting wire 23 and frame 19, door 16 is opened and screw rod 40 is rotated to move the block of butter forward through said opening, before wire enters the body of butter and cuts a slice from the forward end thereof and the forward feed of the butter ceases when pin 51a, on pawl 43, strikes the upper end of stop bar 50 and swings the point of said pawl out of notch 42.

As the pawl 43 is thus disengaged from rack bar 38, pin 51 swings inward away from bar 50 and its guide 49 and rides down against said housing, as frame 19 carrying wire 23 complete their downward travel.

The cut slice of butter drops onto the inclined door 16 and passes therefrom onto pan 12.

As the point of pawl 43 is disengaged from notch 42, the pull of slightly inclined coil spring 40 will tilt rack bar 30 on its bearing 40, thereby disengaging the teeth of said bar from pinion 37 and said spring now draws said bar to its upper limit of movement.

When pressure on plate 20 is removed, spring 48 acts to draw plate 46 and pawl 42 upwardly, and when pin 51a, on said pawl, strikes against stop 51, such upward movement terminates and spring 45 now acts to swing pawl on its pivot 44, to reengage the point of said pawl in notch 42, with pin 51 positioned so as to strike the upper end of bar 50 on the subsequent slicing operation.

The operations just described are repeated until the entire block of butter is cut into slices and when lever 63 strikes against bracket 66, shaft 61 will be rotated, thereby shifting shaft 65 lengthwise in tube 60, to move pin 64 from the deep end a of notch 35 to the shallow portion b thus withdrawing nut 62 from the thread or shaft 33 and spring tape 29, under tension of the spring in housing 32, will now draw plate 28, frame 27 and parts carried thereby rearwardly.

As lever 63, tilted rearwardly, approaches the rear wall of housing 11, it will be tilted forwardly as it contacts lever 67, so as to rock shaft 61, thereby moving pin 64 into the deep end a of notch 65, thus enabling the nut 62 to engage the thread of shaft 33, and at the same time striking and sounding bell 68.

A block of butter is now placed in the trough 13 and the slicing operations as described, may be repeated.

Blocks of butter to be sliced in the machine may be stored and maintained in cool condition in the space within the housing on the opposite side of the trough, from shaft 33 and associated parts.

Thus it will be seen that I have provided a butter cutting machine that is simple in structure, inexpensive of manufacture and very effective in performing the functions for which it is intended.

Obviously a machine of my improved construction may be used for cutting and slicing products other than butter, for instance, cheese, ice cream, soap and the like.

It will be understood that minor changes in the size, form and construction of the various parts of my improved butter slicing machine may be made and substituted for those herein shown and described without departing from the spirit of the invention, the scope of which is set forth in the appended claims.

I claim as my invention:

1. In a machine for cutting butter and the like the combination with, a housing having an opening in its front wall of a pan projecting forwardly from said housing a substantial distance below said opening, a trough positioned within said housing to the rear of said opening, a door hinged to the front wall of said housing just below the opening therein and a substantial distance above said pan for normally closing said opening and when swung downwardly providing an inclined chute for delivering the slices cut by the machine into said pan, a frame arranged for sliding movement on the outer face of the housing wall having said opening, an operating connection between said frame and door, a plate arranged to slide lengthwise in said trough, means including a threaded shaft lying parallel with the trough and a nut carried by said plate and adapted to engage said threaded rod for moving said plate forwardly in said trough, a cutting member carried by said sliding frame a pinion on said shaft, a spring held rack engaging said pinion, a vertically movable spring held pawl adapted to engage and move said rack downward, which pawl is connected to said frame, an adjustable member for actuating said pawl to release said rack at the lower end of the travel thereof, and a fixed member for actuating said pawl to engage said rack at the upper end of the travel thereof.

2. A butter cutting machine as set forth in claim 1, with manually operable means for changing the vertical position of said adjustable member.

LOUIS FRANK.

REFERENCES CITED

The following references are of record in the file of this patent:

UNITED STATES PATENTS

| Number | Name | Date |
|---|---|---|
| Re. 17,175 | Von Glahn | Dec. 25, 1928 |
| 1,339,768 | Hartung | Dec. 13, 1921 |
| 1,499,235 | Livingston | June 24, 1924 |
| 1,583,637 | Wilson | May 4, 1926 |
| 1,708,771 | Noble | Apr. 9, 1929 |
| 1,848,642 | Micheli | Mar. 8, 1932 |
| 2,216,980 | Miller | Oct. 8, 1940 |
| 2,328,800 | Gustafson et al. | Sept. 7, 1943 |